Nov. 4, 1924.
J. STEPHENSON
1,513,944
FLEXIBLE COUPLING AND SHOCK ABSORBER
Original Filed Sept. 20, 1919    2 Sheets—Sheet 1
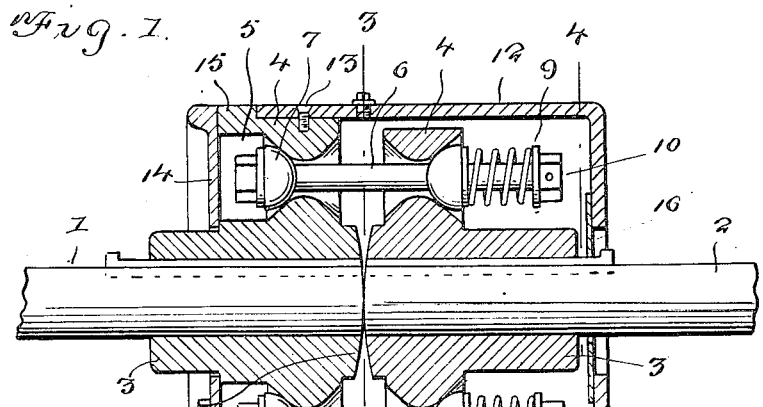
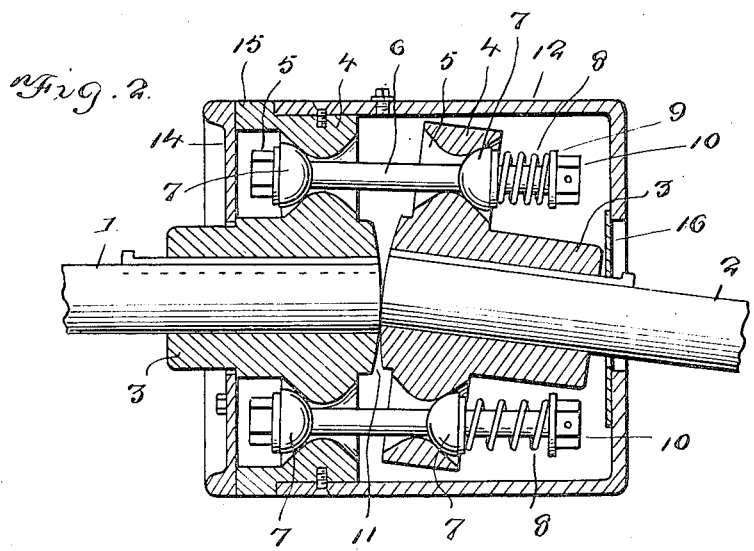
WITNESS:
E. R. Ruppart
J. Stephenson
INVENTOR.
BY
Victor J. Evans
ATTORNEY.

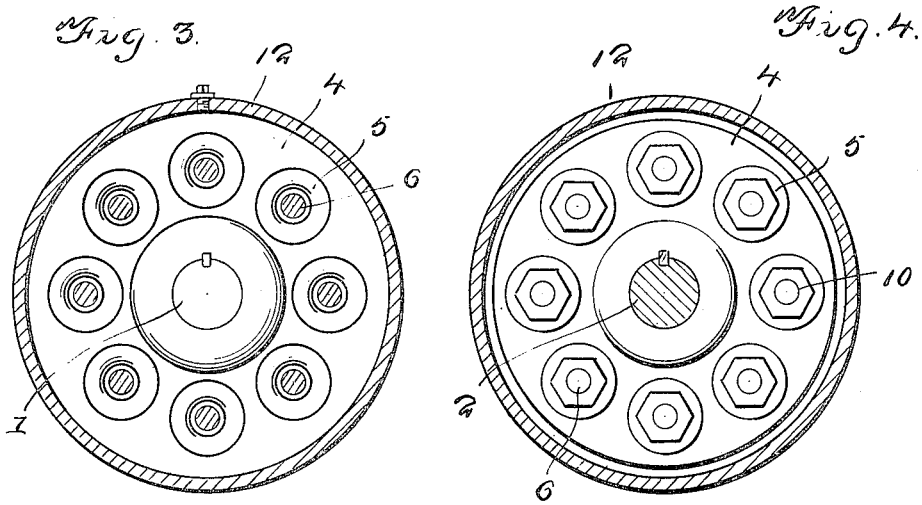
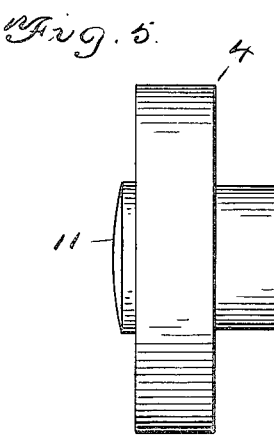
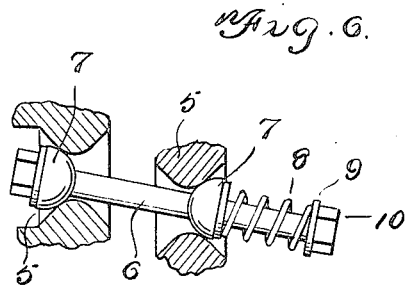

Patented Nov. 4, 1924.

1,513,944

UNITED STATES PATENT OFFICE.

JOHN STEPHENSON, OF HALIFAX, NOVA SCOTIA, CANADA.

FLEXIBLE COUPLING AND SHOCK ABSORBER.

Application filed September 20, 1919, Serial No. 325,063. Renewed October 6, 1922. Serial No. 592,848.

*To all whom it may concern:*

Be it known that I, JOHN STEPHENSON, a subject to the King of England, residing at Halifax, in the Province of Nova Scotia and Dominion of Canada, have invented new and useful Improvements in Flexible Couplings and Shock Absorbers, of which the following is a specification.

This invention relates to means for coupling a driven part to a driving part, and the principal object of the invention is to provide means whereby the coupling may be a flexible one and one which will act as a shock absorber.

Another object of the invention is to provide means for controlling the flexibility of the coupling so as to make the coupling capable of being used on different kinds of machinery.

The invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:

Figure 1 is a sectional view of the invention with the shafts in alinement;

Figure 2 is a like view with the shafts out of alinement;

Figure 3 is a section on line 3—3 of Figure 1;

Figure 4 is a section on line 4—4 of Figure 1;

Figure 5 is a view of one of the coupling members and its flange;

Figure 6 is a sectional detail view showing the position the bolts assume due to torsion.

In these views 1 indicates the drive shaft and 2 the driven shaft. Each shaft carries a coupling member 3 which is suitably secured to the shaft by a key or the like. Each coupling member is provided with a flange 4 and said flange has formed therein an annular row of openings 5. Each opening is of hourglass form, as shown and the two members are connected together by the bolts 6 which pass through these openings. These bolts carry the semi-spherical shaped washers 7 which engage the flaring ends of the openings 5 and one washer on each bolt is yieldingly held in position by means of a coiled spring 8 having one end bearing against the washer and its other end engaging a flat washer 9 which is held in place by the nut 10. In this way by adjusting the nuts 10 the tension of the springs may be regulated so as to control the flexibility of the coupling. The abutting ends of the coupling members are rounded slightly as at 11 so that they may roll on each other.

One coupling member has secured thereto a casing 12 which may be formed in a single piece or several pieces, as desired. As illustrated, the casing is secured to one of the flanges by the screws 13 and is provided with a cap 14 which is also screwed to the flange, this flange being provided with an extension 15 to receive this cap. The opening in the other end of the casing through which the shaft 2 passes is closed by a disc 16. This casing is adapted to be filled with grease or other lubricant, so that the parts will be thoroughly lubricated. It will be seen that the smallest diameters of the holes 5 are much larger than the diameters of the bolts 6 so that said bolts will move freely in the openings as shown in Figures 2 and 6.

My coupling may be used in many different situations and is well suited for use where the shaft gets out of alinement. The coupling may be used on machines where sudden stops and reversing takes place. The coupling acts as a shock absorber, due to the torsional deflection which takes place between the two parts of the coupling and the amount of this deflection may be regulated by means of the springs on the bolts and their adjusting nuts.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A coupling comprising a pair of shafts having their inner ends rounded and arranged in abutting relation, a sleeve keyed to the inner end of each of the shafts, a rounded enlargement carried by the abutting ends of the shaft, the rounded enlargement being disposed in opposed contacting relation and the rounded surfaces being continuous with the rounded ends of the shafts, an annulus encircling each rounded enlargement and provided with openings flared at each end, one of the annuli being provided with an annular shoulder, a casing enclosing the meeting ends of the shaft and secured to one of the annuli and engaging the shoulder at one end, a plate positioned against one of the annuli and a plurality of bolts passing through the openings, semi-spherical heads formed in the bolts and disposed in the ends of the openings and coil springs carried by the bolts and bearing against the adjacent semi-spherical members.

In testimony whereof I affix my signature.

JOHN STEPHENSON